US010410651B2

(12) United States Patent
Lou et al.

(10) Patent No.: US 10,410,651 B2
(45) Date of Patent: Sep. 10, 2019

(54) DE-REVERBERATION CONTROL METHOD AND DEVICE OF SOUND PRODUCING EQUIPMENT

(71) Applicant: Beijing Xiaoniao Tingting Technology Co., LTD., Beijing (CN)

(72) Inventors: Shasha Lou, Beijing (CN); Bo Li, Beijing (CN)

(73) Assignee: Beijing Xiaoniao Tingting Technology Co., Ltd., Beijing (CN)

( * ) Notice: Subject to any disclaimer, the term of this patent is extended or adjusted under 35 U.S.C. 154(b) by 105 days.

(21) Appl. No.: 15/849,091

(22) Filed: Dec. 20, 2017

(65) Prior Publication Data

US 2018/0190308 A1 Jul. 5, 2018

(30) Foreign Application Priority Data

Dec. 29, 2016 (CN) .......................... 2016 1 1242997

(51) Int. Cl.
*G10L 21/00* (2013.01)
*G10L 25/00* (2013.01)
(Continued)

(52) U.S. Cl.
CPC .......... *G10L 21/0208* (2013.01); *G10L 21/02* (2013.01); *H04R 1/32* (2013.01);
(Continued)

(58) Field of Classification Search
CPC ... G10L 21/00; G10L 21/02; G10L 21/02082; G10L 15/00; G10L 15/26; G10L 15/265; G10L 99/00
See application file for complete search history.

(56) References Cited

U.S. PATENT DOCUMENTS

2005/0047611 A1 3/2005 Mao
2006/0074686 A1 4/2006 Vignoli
(Continued)

FOREIGN PATENT DOCUMENTS

CN 100508029 C 7/2009
CN 104012074 A 8/2014
(Continued)

OTHER PUBLICATIONS

Gomez, Randy, Keisuke Nakamura, and Kazuhiro Nakadai. "Robustness to speaker position in distant-talking automatic speech recognition." Acoustics, Speech and Signal Processing (ICASSP), 2013 IEEE International Conference on. IEEE, 2013.*
(Continued)

*Primary Examiner* — Paras D Shah
(74) *Attorney, Agent, or Firm* — Mintz Levin Cohn Ferris Glovsky and Popeo, P.C.; Kongsik Kim

(57) ABSTRACT

A de-reverberation control method and device of sound producing equipment are disclosed. The method includes that: when a piece of equipment performs audio playing, a voice signal from a user is collected in real time; a relative position of the user with respect to the equipment and acoustic parameters of a room environment in which the equipment is located, are acquired; according to one or more of the relative position and the acoustic parameters, a corresponding microphone in the equipment is selected, and a corresponding voice enhancement mode is called to perform de-reverberation; a voice command word from the user is acquired to control the equipment to perform a corresponding function, as a respond to the user. The present solution can improve the recognition accuracy of a voice command, and improve user interaction experience.

20 Claims, 3 Drawing Sheets

(51) Int. Cl.

| | |
|---|---|
| ***G10L 15/00*** | (2013.01) |
| ***G10L 21/0208*** | (2013.01) |
| ***G10L 21/02*** | (2013.01) |
| ***H04R 1/32*** | (2006.01) |
| *G10L 21/0216* | (2013.01) |
| *G10L 15/22* | (2006.01) |

(52) U.S. Cl.

CPC .................... *G10L 2015/223* (2013.01); *G10L 2021/02082* (2013.01); *G10L 2021/02087* (2013.01); *G10L 2021/02166* (2013.01)

(56) References Cited

U.S. PATENT DOCUMENTS

| | | | | |
|---|---|---|---|---|
| 2010/0008518 | A1 | 1/2010 | Mao | |
| 2012/0206553 | A1* | 8/2012 | MacDonald ........ | H04M 1/2535 348/14.01 |
| 2013/0136089 | A1* | 5/2013 | Gillett ................. | H04W 72/048 370/329 |
| 2013/0156198 | A1* | 6/2013 | Kim ....................... | H04R 1/323 381/17 |
| 2014/0056439 | A1* | 2/2014 | Kim ......................... | H04R 3/00 381/92 |
| 2015/0181328 | A1* | 6/2015 | Gupta .................... | H04R 3/005 381/56 |
| 2015/0189435 | A1* | 7/2015 | Sako ...................... | H04R 3/005 381/92 |
| 2016/0073198 | A1 | 3/2016 | Vilermo et al. | |
| 2016/0098989 | A1 | 4/2016 | Layton et al. | |
| 2017/0188437 | A1* | 6/2017 | Banta ...................... | G10L 15/22 |

FOREIGN PATENT DOCUMENTS

| | | | |
|---|---|---|---|
| CN | 105957528 | A | 9/2016 |
| CN | 106128451 | A | 11/2016 |
| EP | 3002754 | A1 | 4/2016 |
| WO | 2004038697 | A1 | 5/2004 |
| WO | 2014147442 | A1 | 9/2014 |
| WO | 2016049403 | A1 | 3/2016 |

OTHER PUBLICATIONS

Yoshioka, Takuya, et al. “Adaptive dereverberation of speech signals with speaker-position change detection.” Acoustics, Speech and Signal Processing, 2009. ICASSP 2009. IEEE International Conference on. IEEE, 2009.*

Supplementary European Search Report issued in corresponding EP Application 17208986.4, dated Mar. 2, 2018, 8 pages.

* cited by examiner

DE-REVERBERATION CONTROL METHOD AND DEVICE OF SOUND PRODUCING EQUIPMENT

CROSS-REFERENCE TO RELATED APPLICATION

The application claims priority to Chinese Application No. 201611242997.7 filed on Dec. 29, 2016, which is incorporated herein by reference.

TECHNICAL FIELD

The present disclosure relates to the technical field of voice interaction, and in particular to a de-reverberation control method and device of sound producing equipment.

BACKGROUND

With the development of intelligent technology, many manufactures start to consider providing a voice recognition function in intelligent products. For example, computers, mobile phones, home appliances and other products are required to support wireless connection, remote control, voice interaction, and so on.

However, when a user performs voice interaction with the intelligent product, the sound made by the user is collected by the intelligent product after being reflected by a room, and thus reverberation is generated. Since the reverberation contains a signal similar to a correct signal, and has a relatively large interference on extraction of voice information and voice feature, it is desired to perform de-reverberation. The existing de-reverberation solution fails to be well applied to a scenario where the user interacts with the intelligent product. The existing de-reverberation solution either has a low de-reverberation degree which causes large reverberation residue, or has a high de-reverberation degree which attenuates a user's voice. Accordingly, recognition accuracy of a voice command may be severely reduced and thus the product fails to respond timely to a command from the user, leading to a poor interaction experience.

SUMMARY

The disclosure is intended to provide a de-reverberation control method and device of sound producing equipment, for solving the problem of low recognition accuracy of a voice command and poor interaction experience in the current products.

To this end, the technical solutions of the disclosure are implemented as follows.

According to an aspect, the disclosure provides a de-reverberation control method of sound producing equipment, which includes that:

when a piece of equipment performs audio playing, a voice signal from a user is collected in real time;

a relative position of the user with respect to the equipment and acoustic parameters of a room environment in which the user and the equipment are located, are acquired;

according to one or more of the relative position and the acoustic parameters, a corresponding microphone in the equipment is selected, and a corresponding voice enhancement mode is called to perform de-reverberation; and a voice command word from the user is acquired, and the equipment is controlled to perform a function corresponding to the voice command, as a respond to the user.

According to another aspect, the disclosure provides a de-reverberation control device of sound producing equipment, which includes:

a voice collector, which is arranged to, when the equipment performs audio playing, collect the voice signal from the user in real time;

a factor acquiring unit, which is arranged to acquire the relative position of the user with respect to the equipment and the acoustic parameters of the room environment in which the equipment is located;

a de-reverberation performing unit, which is arranged to, according to one or more of the relative position and the acoustic parameters, select the corresponding microphone in the equipment, and call the corresponding voice enhancement mode to perform the de-reverberation; and a command executing unit, which is arranged to acquire the voice command word from the user, and control the equipment to perform the corresponding function, as a respond to the user.

By means of the technical solutions of the disclosure, when the voice enhancement mode is adjusted based on the relative position of the user with respect to the equipment, the user's voice can be enhanced or protected better while the de-reverberation is performed, and voice recognition accuracy can be improved; when the de-reverberation is performed based on the acoustic parameters associated with the user and the equipment, different voice enhancement modes can be adopted according to the change of acoustics environments indicated by the acoustic parameters to ensure an appropriate de-reverberation degree, thereby solving the problem of large reverberation residue or attenuated user's voice in the current solution, and achieving higher recognition accuracy. It can be understood that when the de-reverberation is performed based on both user information and environment information, the voice recognition accuracy can be further improved.

DETAILED DESCRIPTION

For making the aim, the technical solutions and the advantages of the disclosure more clear, implementation modes of the disclosure are further elaborated below in combination with the accompanying drawings.

Figure 1:
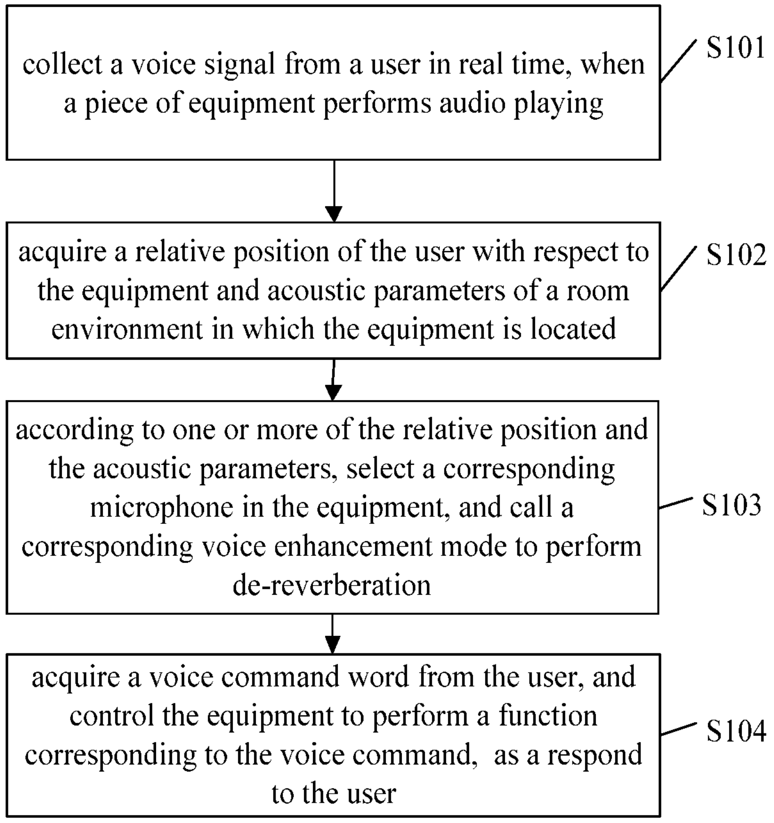
FIG. 1 is a schematic diagram of a de-reverberation control method of sound producing equipment provided by an embodiment of the disclosure.

An embodiment of the disclosure provides a de-reverberation control method of sound producing equipment. As shown in FIG. 1, the method includes the following actions.

In S101, when a piece of equipment performs audio playing, a voice signal from a user is collected in real time.

In S102, a relative position of the user with respect to the equipment and acoustic parameters of a room environment in which the user and the equipment are located, are acquired.

In the embodiment, when a factor (also called a reference quality) for controlling de-reverberation is selected, a comprehensive factor containing both user information and space information is derived based on two basic factors, namely a user-related quantity and a space-related quantity.

For example, a direction and distance of the user relative to the equipment is acquired as the relative position which is the user-related quantity. The acoustic parameters may belong to either the basic factor or the comprehensive factor. For example, reverberation time (T60, T30, T20 or the like) of a room environment belongs to a space-related quantity. A direct-to-reverberant ratio of user's voice (the ratio of direct sound to reverberant sound in the user's voice collected by the equipment), and an intelligibility (e.g. C50) obtained by the equipment using its built-in microphone array to collect the user's voice and then calculate, are associated with the user and the space, and belong to the comprehensive factor.

In S103, according to one or more of the relative position and the acoustic parameters, a corresponding microphone in the equipment is selected, and a corresponding voice enhancement mode is called to perform de-reverberation.

S104: a voice command word from the user is acquired, and the equipment is controlled to perform a function corresponding to the voice command, as a respond to the user.

From the above, by means of the technical solutions of the disclosure, when the voice enhancement mode is adjusted based on the relative position of the user with respect to the equipment, the user's voice can be enhanced or protected better while the de-reverberation is performed, and the voice recognition accuracy can be improved. When the de-reverberation is performed based on the acoustic parameters associated with the user and the equipment, different voice enhancement modes can be adopted according to the change of acoustics environments indicated by the acoustic parameters to ensure an appropriate de-reverberation degree. Therefore, the problem of large reverberation residue or attenuated user's voice in the current solution may be solved, and thus a higher recognition accuracy may be obtained. It can be understood that when the de-reverberation is performed based on both user information and environment information, the voice recognition accuracy can be further improved.

In another embodiment based on the embodiment shown in FIG. 1, in order to match the feature of voice interaction between the user and the equipment more, while S102 is performed, the method may further include but not limited to the following actions. When a wake-up word is detected from the voice signal collected by the equipment, the equipment is controlled to stop the audio playing. Alternatively, when the wake-up word is detected from the voice signal, a volume at which the equipment performs the audio playing is lowered to be below a volume threshold.

In this way, according to the feature of a scenario of voice interaction between the user and the equipment, when the wake-up word is detected, it is judged that the user has a new requirement at this point, then the equipment is controlled to stop the current audios, and a new command of the user is waited, which not only contributes to further improving the recognition accuracy of the new command, but also conforms to a usage habit of the scenario of voice interaction, thereby improving interaction experience.

The action of controlling the audio playing and S102 are performed at the same time, thereby shortening the response time and responding to the user more timely.

Furthermore, in S104, the command word includes commands of controlling built-in functions of the equipment. For example, the command word may include the command of controlling the play volume of a speaker of the equipment, the command of controlling the equipment to move, the command of controlling an application program installed in the equipment, and the like.

Since relative to the wake-up words, the number of command words is large, and the content of the command words is complex, in order to reduce the equipment load and improve the recognition accuracy, a cloud processing mode is adopted for the command word in the this embodiment. After the equipment stops the audio playing, the voice signal sent by the user after the wake-up word is collected. The voice signal is transmitted to a cloud server, the cloud server performs feature matching on the voice signal, and acquires the command word from the voice signal upon that the feature matching is successful. The command word returned by the cloud server is received, and the equipment is controlled to perform the corresponding function according to the command word, so as to correspondingly respond to the user.

In another embodiment of the disclosure, how to perform the de-reverberation based on the user-related quantity and the space-related quantity is described in detail. Other embodiments may be referred for other content of the solution.

The sound producing equipment in each embodiment of the disclosure is a sound producing equipment a microphone array. The microphone array is used to collect the user's voice and perform de-reverberation. In a process of performing de-reverberation according to the basic factor or the comprehensive factor, the microphones selected according to product requirements and usage scenarios are different. It is possible to select either all the microphones in the microphone array or a part of microphones in the microphone array. For example, if the user is nearby, and the voice is loud and clear, merely using a part of microphones can achieve the effect of using all the microphones, then there is no need to use all the microphones. If the user is far away, and the voice is weak and the reverberation is heavy, it is required to use all the microphones to process.

For a scenario where multiple factors are required to perform de-reverberation, in the present embodiment, priorities are respectively set for factors included in the relative position and the acoustic parameters. From a highest priority to a lowest priority, the de-reverberation is performed based on the factors one by one. Alternatively, the de-reverberation is performed only based on one or more of the factors which has a priority higher than a predetermined level. Adopting the processing mode based on the priorities can not only provide a targeted voice enhancement mode according to different scenarios to achieve a better de-reverberation effect, but can reduce calculation complexity and shorten the response time. It should be noted that, de-reverberation may also be performed based on all the factors without considering the priorities.

For example, the priority of the relative position is set to be higher than the priority of the acoustic parameter, and the priority of the direction is set to be higher than the priority of the distance in the relative position. During the de-reverberation, the direction is first adopted, then the distance is adopted, and finally the acoustic parameter is adopted. Alternatively, a level value and a level threshold are set for the priority of each factor. For example, if the level value of the relative position is 5, the level value of the acoustic parameter is 3, and the level threshold is 4, when the factor with the priority higher than 4 is adopted according to a rule, the de-reverberation is performed only using the relative position. It can be understood that multiple priority levels can be respectively set for the factors in the acoustic parameters, and the processing mode similar to the above is adopted.

In the present embodiment, the de-reverberation may be performed in the following implementations.

A First Implementation

According to the direction of the user relative to the equipment, the corresponding microphone in the equipment is selected, and the voice direction enhanced by the voice enhancement mode is adjusted to perform the de-reverberation.

A Second Implementation

When the distance of the user relative to the equipment is less than a first distance threshold, a de-reverberation degree and a voice amplification function in the voice enhancement mode are reduced to a first enhancement level. When the distance of the user relative to the equipment is greater than a second distance threshold, the de-reverberation degree and the voice amplification function in the voice enhancement mode are improved to a second enhancement level. When the distance of the user relative to the equipment is greater than the first distance threshold and less than the second distance threshold, the de-reverberation degree and the voice amplification function in the voice enhancement mode are adjusted to be between the first enhancement level and the second enhancement level.

When the user is close to the equipment, the de-reverberation degree and the amplification degree of user's voice are reduced. When the user is far away from the equipment, the de-reverberation degree and the amplification degree of user's voice are improved.

A Third Implementation

When a reverberation degree in the room environment indicated by the acoustic parameters is greater than a first reverberation threshold, the de-reverberation degree in the voice enhancement mode is improved to a first degree. When the reverberation degree in the room environment indicated by the acoustic parameters is less than a second reverberation threshold, the de-reverberation degree in the voice enhancement mode is reduced to a second degree. When the reverberation degree in the room environment indicated by the acoustic parameters is greater than the first reverberation threshold and less than the second reverberation threshold, the de-reverberation degree in the voice enhancement mode is adjusted to be between the first degree and the second degree.

When the reverberation degree in the room environment is greater, the de-reverberation degree is improved. When the reverberation degree in the room is lesser, the de-reverberation degree is reduced.

Only the operations, closely related to the solution, in the voice enhancement mode are described above, but there are more operations; for example, equalization processing will be performed on the voice signal.

The specific values of the reverberation threshold and the reverberation degree are not strictly limited here, but can vary in a specific range.

Figure 2:
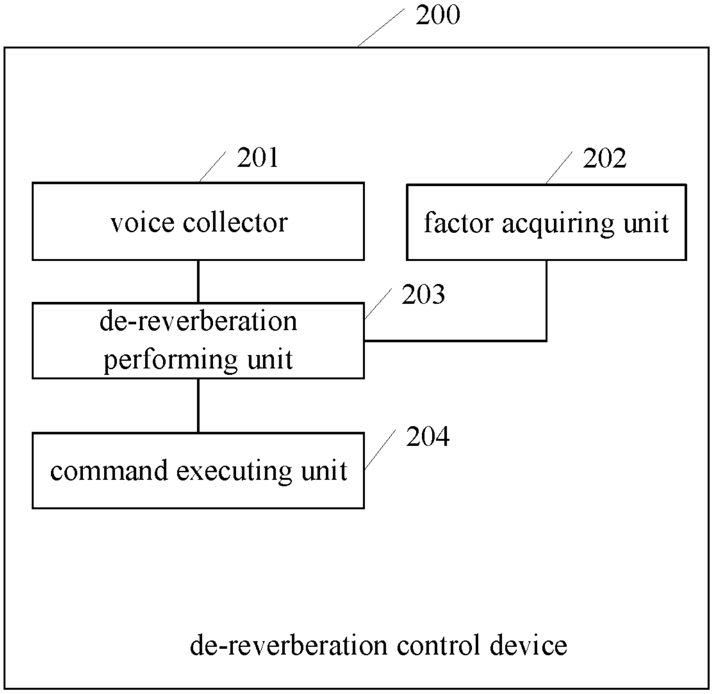
FIG. 2 is a structure diagram of a de-reverberation control device of sound producing equipment provided by another embodiment of the disclosure.

Another embodiment of the disclosure provides a de-reverberation control device 200 of sound producing equipment. As shown in FIG. 2, the device 200 includes a voice collector 201, a factor acquiring unit 202, a de-reverberation performing unit 203 and a command executing unit 204.

The voice collector 201 is arranged to, when the equipment performs audio playing, collect the voice signal from the user in real time. The voice collector can be implemented by the microphone array in the equipment.

The factor acquiring unit 202 is arranged to acquire the relative position of the user with respect to the equipment and the acoustic parameters of the room environment in which the equipment is located.

The de-reverberation performing unit 203 is arranged to, according to one or more of the relative position and the acoustic parameters, select the corresponding microphone in the equipment, and call the corresponding voice enhancement mode to perform the de-reverberation.

The command executing unit 204 is arranged to acquire the voice command word from the user, and control the equipment to perform the corresponding function, as a respond to the user.

Figure 3:
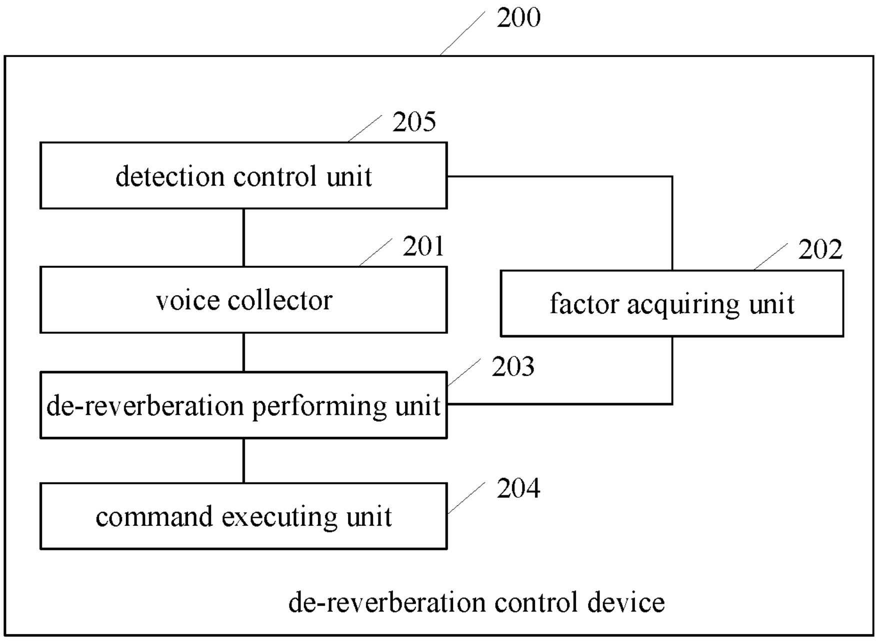
FIG. 3 is a structure diagram of another de-reverberation control device of sound producing equipment provided by another embodiment of the disclosure.

Based on the embodiment shown in FIG. 2, furthermore, as shown in FIG. 3, the device 200 further includes a detection control unit 205. The detection control unit is arranged to, while acquiring the relative position of the user with respect to the equipment and the acoustic parameters of the room environment in which the equipment is located, when the wake-up word is detected from the voice signal, control the equipment to stop the audio playing, or when the wake-up word is detected from the voice signal, lower the volume at which the equipment performs the audio playing to be below the volume threshold.

The de-reverberation performing unit 203 is arranged to respectively set priorities for the factors included in the relative position and the acoustic parameters, and from a highest priority to a lowest priority, perform the de-reverberation based on the factors one by one, or perform the de-reverberation only based on one or more of the factors which has a priority higher than the predetermined level.

The de-reverberation performing unit 203 is specifically arranged to perform at least one of the following three actions:

according to the direction of the user relative to the equipment, select the corresponding microphone in the equipment, and adjust the voice direction enhanced by the voice enhancement mode to perform the de-reverberation; or when the distance of the user relative to the equipment is less than the first distance threshold, reduce the de-reverberation degree and the voice amplification function in the voice enhancement mode to the first enhancement level; when the distance of the user relative to the equipment is greater than the second distance threshold, improve the de-reverberation degree and the voice amplification function in the voice enhancement mode to the second enhancement level; when the distance of the user relative to the equipment is greater than the first distance threshold and less than the second distance threshold, adjust the de-reverberation degree and the voice amplification function in the voice enhancement mode to be between the first enhancement level and the second enhancement level; or when the reverberation degree in the room environment indicated by the acoustic parameters is greater than the first reverberation threshold, improve the de-reverberation degree in the voice enhancement mode to the first degree; when the reverberation degree in the room environment indicated by the acoustic parameters is less than the second reverberation threshold, reduce the de-reverberation degree in the voice enhancement mode to the second degree; when the reverberation degree in the room environment indicated by the acoustic parameters is greater than the first reverberation threshold and less than the second reverberation threshold, adjust the de-reverberation degree in the voice enhancement mode to be between the first degree and the second degree.

The command executing unit 204 is specifically arranged to collect the voice signal sent by the user after the wake-up word, transmit the voice signal to the cloud server. The cloud server performs feature matching on the voice signal, acquires the command word from the voice signal upon that the feature matching is successful, receive the command word returned by the cloud server, and control the equipment to perform the corresponding function according to the command word.

The de-reverberation control device 200 of sound producing equipment is set in the sound producing equipment. The sound producing equipment includes, but is not limited to intelligent portable terminals and intelligence household electrical appliances. The intelligent portable terminals at least include a smart watch, a smart phone or a smart speaker. The intelligence household electrical appliances at least include a smart television, a smart air-conditioner or a smart recharge socket.

The specific working mode of each unit in the embodiment of the device can refer to the related content of the embodiment of the disclosure, so it will not be repeated here.

For example, the voice collector may be a microphone or a microphone array. The factor acquiring unit may be implemented in a range finder such as an infrared range finder and a laser range finder; a direction finder such as a radio direction finder; and a processor. The de-reverberation performing unit and the command executing unit may be implemented in a processor. The device may further include a transceiver arranged to transmit/receive a signal.

From the above, by means of the technical solutions of the disclosure, when the voice enhancement mode is adjusted based on the relative position of the user with respect to the equipment, the user's voice can be enhanced or protected better while the de-reverberation is performed, and the voice recognition accuracy can be improved. When the de-reverberation is performed based on the acoustic parameters associated with the user and the equipment, different voice enhancement modes can be adopted according to the change of acoustics environments indicated by the acoustic parameters to ensure an appropriate de-reverberation degree, thereby solving the problem of large reverberation residue or attenuated user's voice in the current solution, and achieving higher recognition accuracy. It can be understood that when the de-reverberation is performed based on both user information and environment information, the voice recognition accuracy can be further improved.

Those ordinary skilled in the art can understand that all or a part of steps of the above embodiments can be performed by using a computer program flow. The computer program can be stored in a computer readable storage medium. The computer program, when executed on corresponding hardware platforms (such as system, installation, equipment and device) performs one of or a combination of the steps in the method.

Optionally, all or a part of steps of the above embodiments can also be performed by using an integrated circuit. These steps may be respectively made into integrated circuit modules. Alternatively, multiple modules or steps may be made into a single integrated circuit module.

The devices/function modules/function units in the above embodiment can be realized by using a general computing device. The devices/function modules/function units can be either integrated on a single computing device, or distributed on a network composed of multiple computing devices.

When the devices/function modules/function units in the above embodiment are realized in form of software function module and sold or used as an independent product, they can be stored in a computer-readable storage medium. The computer-readable storage medium may be an ROM, a magnetic disk or a compact disk.

The above is only the preferred embodiment of the disclosure and not intended to limit the disclosure. Any modifications, equivalent replacements, improvements and the like within the spirit and principle of the disclosure shall fall within the scope of protection of the disclosure.

The invention claimed is:

1. A de-reverberation control method of a piece of sound producing equipment, the method comprising:

collecting a voice signal from a user in real time when the equipment performs audio playing;

acquiring a relative position of the user with respect to the equipment and acoustic parameters of a room environment in which the user and the equipment are located;

according to one or more of the relative position and the acoustic parameters, selecting one or more corresponding microphones in the equipment, and calling a corresponding voice enhancement mode to perform de-reverberation of the collected voice signal from the selected one or more corresponding microphones;

acquiring a voice command word from the de-reverberated voice signal and controlling the equipment to perform a function corresponding to the voice command, as a response to the user.

2. The method according to claim 1, wherein while acquiring the relative position of the user with respect to the equipment and the acoustic parameters of the room environment in which the user and the equipment are located, the method further comprises:

controlling the equipment to stop the audio playing when a wake-up word is detected from the voice signal; or lowering a volume at which the equipment performs the audio playing, to be below a volume threshold when the wake-up word is detected from the voice signal.

3. The method according to claim 1, wherein acquiring a relative position of the user with respect to the equipment and acoustic parameters of the room environment in which the user and the equipment are located, comprises:

acquiring a direction and distance of the user relative to the equipment as the relative position; and acquiring a reverberation time, a direct-to-reverberant ratio of the user's voice and an intelligibility index of a voice collected by the equipment in the room environment in which the equipment and user are located, as the acoustic parameters.

4. The method according to claim 1, wherein according to one or more of the relative position and the acoustic parameters, selecting the one or more corresponding microphones in the equipment, and calling the corresponding voice enhancement mode to perform the de-reverberation of the collected voice signal from the selected one or more corresponding microphones comprises:

according to one or more of the relative position and the acoustic parameters, selecting all microphones in the equipment as currently used microphones, and calling a corresponding voice enhancement mode to perform the de-reverberation of the collected voice signal from the selected all microphones; or, according to one or more of the relative position and the acoustic parameters, selecting a part of microphones in the equipment as the currently used microphones, and calling a corresponding voice enhancement mode to perform the de-reverberation of the collected voice signal from the selected part of microphones.

5. The method according to claim 3, wherein according to one or more of the relative position and the acoustic parameters, selecting the one or more corresponding microphones in the equipment, and calling the corresponding voice enhancement mode to perform the de-reverberation of the collected voice signal from the selected one or more corresponding microphones comprises:

setting priorities respectively for factors comprising the relative position and the acoustic parameters;

from a highest priority to a lowest priority, performing the de-reverberation based on the factors one by one; or, performing the de-reverberation only based on one or more of the factors which has a priority higher than a predetermined level.

6. The method according to claim 4, wherein according to one or more of the relative position and the acoustic parameters, selecting the one or more corresponding microphones in the equipment, and calling the corresponding voice enhancement mode to perform the de-reverberation of the collected voice signal from the selected one or more corresponding microphones comprises at least one of the following three actions:

according to the direction of the user relative to the equipment, selecting the one or more corresponding microphones in the equipment, and adjusting a sound direction enhanced by the voice enhancement mode to perform the de-reverberation; or, when the distance of the user relative to the equipment is less than a first distance threshold, reducing a de-reverberation degree and a voice amplification function in the voice enhancement mode to a first enhancement level; when the distance of the user relative to the equipment is greater than a second distance threshold, improving the de-reverberation degree and the voice amplification function in the voice enhancement mode to a second enhancement level; when the distance of the user relative to the equipment is greater than the first distance threshold and less than the second distance threshold, adjusting the de-reverberation degree and the voice amplification function in the voice enhancement mode to be between the first enhancement level and the second enhancement level; or, when a reverberation degree in the room environment indicated by the acoustic parameters is greater than a first reverberation threshold, improving the de-reverberation degree in the voice enhancement mode to a first degree; when the reverberation degree in the room environment indicated by the acoustic parameters is less than a second reverberation threshold, reducing the de-reverberation degree in the voice enhancement mode to a second degree; when the reverberation degree in the room environment indicated by the acoustic parameters is greater than the first reverberation threshold and less than the second reverberation threshold, adjusting the de-reverberation degree in the voice enhancement mode to be between the first degree and the second degree.

7. The method according to claim 2, further comprising:

collecting a voice signal sent by the user after the wake-up word;

transmitting the voice signal to a cloud server which performs feature matching on the voice signal and acquires the command word from the voice signal upon that the feature matching is successful; and receiving the command word returned by the cloud server, and controlling the equipment to perform the corresponding function according to the command word.

8. A de-reverberation control device of a piece of sound producing equipment, the device comprising:

a voice collector, which is arranged to, when the equipment performs audio playing, collect a voice signal from a user in real time;

a range and direction finder, which is arranged to acquire a relative position of the user with respect to the equipment;

a processor, which is arranged to acquire, based on the voice signal, acoustic parameters of a room environment in which the equipment is located;

wherein the processor is further arranged to:

according to one or more of the relative position and the acoustic parameters, select one or more corresponding microphones in the equipment, and call a corresponding voice enhancement mode to perform de-reverberation of the collected voice signal from the selected one or more corresponding microphones; and acquire a voice command word from the de-reverberated voice signal, the selected one or more corresponding microphones, and control the equipment to perform a function corresponding to the voice command, as a response to the user.

9. The device according to claim 8, wherein the processor is further arranged to:

while acquiring the relative position of the user with respect to the equipment and the acoustic parameters of the room environment in which the equipment is located:

when a wake-up word is detected from the voice signal, control the equipment to stop the audio playing; or when the wake-up word is detected from the voice signal, lower a volume at which the equipment performs the audio playing, to be below a volume threshold.

10. The device according to claim 8, wherein the range and direction finder is arranged to acquire a direction and distance of the user relative to the equipment as the relative position; and the processor is arranged to acquire a reverberation time, a direct-to-reverberant ratio of the user's voice and an intelligibility index of a voice collected by the equipment in the room environment in which the equipment and user are located, as the acoustic parameters.

11. The device according to claim 8, wherein the processor is further arranged to:

according to one or more of the relative position and the acoustic parameters, select all microphones in the equipment as currently used microphones, and call a corresponding voice enhancement mode to perform the de-reverberation; or, according to one or more of the relative position and the acoustic parameters, select a part of microphones in the equipment as the currently used microphones, and call a corresponding voice enhancement mode to perform the de-reverberation.

12. The device according to claim 10, wherein the processor is further arranged to:

set priorities respectively for factors comprising the relative position and the acoustic parameters;

from a highest priority to a lowest priority, perform the de-reverberation based on the factors one by one; or, perform the de-reverberation only based on one or more of the factors which has a priority higher than a predetermined level.

13. The device according to claim 11, wherein the processor is arranged to perform at least one of the following three operations:

according to the direction of the user relative to the equipment, select the one or more corresponding microphones in the equipment, and adjust a sound direction enhanced by the voice enhancement mode to perform the de-reverberation; or when the distance of the user relative to the equipment is less than a first distance threshold, reduce a de-reverberation degree and a voice amplification function in the voice enhancement mode to a first enhancement level; when the distance of the user relative to the equipment is greater than a second distance threshold, improve the de-reverberation degree and the voice amplification function in the voice enhancement mode to a second enhancement level; when the distance of the user relative to the equipment is greater than the first distance threshold and less than the second distance threshold, adjust the de-reverberation degree and the voice amplification function in the voice enhancement mode to be between the first enhancement level and the second enhancement level; or when a reverberation degree in the room environment indicated by the acoustic parameters is greater than a first reverberation threshold, improve the de-reverberation degree in the voice enhancement mode to a first degree; when the reverberation degree in the room environment indicated by the acoustic parameters is less than a second reverberation threshold, reduce the de-reverberation degree in the voice enhancement mode to a second degree; when the reverberation degree in the room environment indicated by the acoustic parameters is greater than the first reverberation threshold and less than the second reverberation threshold, adjust the de-reverberation degree in the voice enhancement mode to be between the first degree and the second degree.

14. The device according to claim 9, wherein the voice collector is arranged to collect a voice signal sent by the user after the wake-up word, and wherein the processor is arranged to:

transmit the voice signal to a cloud server which performs feature matching on the voice signal and acquires the command word from the voice signal upon that the feature matching is successful; and receive the command word returned by the cloud server, and control the equipment to perform the corresponding function according to the command word.

15. A non-transitory computer readable storage medium, in which a computer executable instruction is stored; the computer executable instruction being used for performing a de-reverberation control method of a piece of sound producing equipment, the method comprising:

collecting a voice signal from a user in real time when the equipment performs audio playing;

acquiring a relative position of the user with respect to the equipment and acoustic parameters of a room environment in which the user and the equipment are located;

according to one or more of the relative position and the acoustic parameters, selecting one or more corresponding microphones in the equipment, and calling a corresponding voice enhancement mode to perform de-reverberation of the collected voice signal from the selected one or more corresponding microphones;

acquiring a voice command word from the de-reverberated voice signal and controlling the equipment to perform a function corresponding to the voice command, as a response to the user.

16. The medium according to claim 15, wherein while acquiring the relative position of the user with respect to the equipment and the acoustic parameters of the room environment in which the user and the equipment are located, the method further comprises:

controlling the equipment to stop the audio playing when a wake-up word is detected from the voice signal; or lowering a volume at which the equipment performs the audio playing, to be below a volume threshold when the wake-up word is detected from the voice signal.

17. The medium according to claim 15, wherein acquiring a relative position of the user with respect to the equipment and acoustic parameters of the room environment in which the user and the equipment are located, comprises:

acquiring a direction and distance of the user relative to the equipment as the relative position; and acquiring a reverberation time, a direct-to-reverberant ratio of the user's voice and an intelligibility index of a voice collected by the equipment in the room environment in which the equipment and user are located, as the acoustic parameters.

18. The medium according to claim 15, wherein according to one or more of the relative position and the acoustic parameters, selecting the one or more corresponding microphones in the equipment, and calling the corresponding voice enhancement mode to perform the de-reverberation of the collected voice signal from the selected one or more corresponding microphones comprises:

according to one or more of the relative position and the acoustic parameters, selecting all microphones in the equipment as currently used microphones, and calling a corresponding voice enhancement mode to perform the de-reverberation of the collected voice signal from the selected all microphones; or, according to one or more of the relative position and the acoustic parameters, selecting a part of microphones in the equipment as the currently used microphones, and calling a corresponding voice enhancement mode to perform the de-reverberation of the collected voice signal from the selected part of microphones.

19. The medium according to claim 17, wherein according to one or more of the relative position and the acoustic parameters, selecting the one or more corresponding microphones in the equipment, and calling the corresponding voice enhancement mode to perform the de-reverberation comprises of the collected voice signal from the selected one or more corresponding microphones:

setting priorities respectively for factors comprising the relative position and the acoustic parameters;

from a highest priority to a lowest priority, performing the de-reverberation based on the factors one by one; or, performing the de-reverberation only based on one or more of the factors which has a priority higher than a predetermined level.

20. The medium according to claim 18, wherein according to one or more of the relative position and the acoustic parameters, selecting the one or more corresponding microphones in the equipment, and calling the corresponding voice enhancement mode to perform the de-reverberation of the collected voice signal from the selected one or more corresponding microphones comprises at least one of the following three actions:

according to the direction of the user relative to the equipment, selecting the one or more corresponding microphones in the equipment, and adjusting a sound direction enhanced by the voice enhancement mode to perform the de-reverberation; or, when the distance of the user relative to the equipment is less than a first distance threshold, reducing a de-reverberation degree and a voice amplification function in the voice enhancement mode to a first enhancement level; when the distance of the user relative to the equipment is greater than a second distance threshold, improving the de-reverberation degree and the voice amplification function in the voice enhancement mode to a second enhancement level; when the distance of the user relative to the equipment is greater than the first distance threshold and less than the second distance threshold, adjusting the de-reverberation degree and the voice amplification function in the voice enhancement mode to be between the first enhancement level and the second enhancement level; or, when a reverberation degree in the room environment indicated by the acoustic parameters is greater than a first reverberation threshold, improving the de-reverberation degree in the voice enhancement mode to a first degree; when the reverberation degree in the room environment indicated by the acoustic parameters is less than a second reverberation threshold, reducing the de-reverberation degree in the voice enhancement mode to a second degree; when the reverberation degree in the room environment indicated by the acoustic parameters is greater than the first reverberation threshold and less than the second reverberation threshold, adjusting the de-reverberation degree in the voice enhancement mode to be between the first degree and the second degree.

* * * * *